US006974153B2

(12) United States Patent
Katsuda

(10) Patent No.: US 6,974,153 B2
(45) Date of Patent: Dec. 13, 2005

(54) GAS GENERATOR FOR AN AIR BELT APPARATUS AND AIR BELT APPARATUS

(75) Inventor: Nobuyuki Katsuda, Himeji (JP)

(73) Assignee: Diacel Chemical Industries, Ltd., Osaka (JP)

( * ) Notice: Subject to any disclaimer, the term of this patent is extended or adjusted under 35 U.S.C. 154(b) by 12 days.

(21) Appl. No.: 10/420,701

(22) Filed: Apr. 23, 2003

(65) Prior Publication Data

US 2004/0046372 A1 Mar. 11, 2004

Related U.S. Application Data

(60) Provisional application No. 60/376,559, filed on May 1, 2002.

(30) Foreign Application Priority Data

Apr. 25, 2002 (JP) ...................................... 2002-123320

(51) Int. Cl.[7] ............................................... B60R 21/18
(52) U.S. Cl. ...................................................... 280/733
(58) Field of Search ................................ 280/733, 802, 280/807, 808

(56) References Cited

U.S. PATENT DOCUMENTS

| | | | | | |
|---|---|---|---|---|---|
| 3,682,498 | A | * | 8/1972 | Rutzki | 280/733 |
| 3,970,329 | A | * | 7/1976 | Lewis | 280/733 |
| 5,346,250 | A | | 9/1994 | Kamiyama | |
| 5,597,178 | A | * | 1/1997 | Hardin, Jr. | 280/733 |
| 6,062,597 | A | * | 5/2000 | Suyama | 280/733 |
| 6,142,511 | A | * | 11/2000 | Lewis | 280/733 |
| 6,471,243 | B1 | * | 10/2002 | Brown | 280/733 |

FOREIGN PATENT DOCUMENTS

JP 5-85301 A 4/1993

* cited by examiner

*Primary Examiner*—Faye M. Fleming
(74) *Attorney, Agent, or Firm*—Birch, Stewart, Kolasch, & Birch, LLP

(57) ABSTRACT

A gas generator 1 for an air belt apparatus which is used in an air belt apparatus for inflating an air belt by introducing a gas discharged from the gas generator, includes a solid gas generating agent adapted to be burnt and generate at least one of a gas and a heat, and a housing accommodating the solid gas generating agent. The housing is provided with a gas discharging port 2 for discharging a gas generated inside the housing in the radial direction of the housing.

16 Claims, 4 Drawing Sheets

GAS GENERATOR FOR AN AIR BELT APPARATUS AND AIR BELT APPARATUS

This nonprovisional application claims priority under 35 U.S.C. § 119(e) on U.S. Provisional Application No. 60/376,559 filed on May 1, 2002 and under 35 U.S.C. § 119(a) on Patent Application No. 2002-123320 filed in Japan on Apr. 25, 2002, which are herein incorporated by reference.

BACKGROUND OF THE INVENTION

1. Field of the Invention

The present invention relates to an apparatus for protecting a vehicle occupant in a moving body, such as a vehicle, an aircraft, and a high-speed ship, at the time of a collision of the moving 55body, and particularly relates to an air belt apparatus which is worn by an occupant like a seat belt and inflated by a gas from a gas generating device.

2. Description of the Related Art

An air belt apparatus inflates at least a part of a belt portion of a seat belt apparatus (in particular, the part that makes contact with a body of a vehicle occupant) upon a collision or a rollover of a vehicle. Usually, this apparatus is provided with an air belt to which a gas is introduced to inflate the air belt, and a gas generator activates upon a vehicle collision and supplies the gas into the air belt.

An air belt apparatus for a vehicle is disclosed, for example, in JP-A No. 5-85301 (U.S. Pat. No. 5,346,250). In the apparatus disclosed in this document, one end of an air belt is connected to a tongue, a gas flow passage is provided in the tongue and a buckle that receives the tongue, and a gas is introduced into the air belt through the gas flow passages. The gas flow passages are connected by inserting the tongue into the buckle.

Once such an air belt apparatus is installed in a vehicle, it is usually used for many years, and therefore, it has to activate unfailingly even after being used for many years.

However, an air belt apparatus which solves an adverse effect that may occur during use for over the years has not been provided yet.

SUMMARY OF THE INVENTION

Thus, the present invention recognizes such an adverse effect that may occur during use for over the years, and further provides means to solve this adverse effect. More concretely, in a conventional air belt apparatus, there is such a possibility that, during use for over years, a gas flow passage (such as a conduit) is clogged by a foreign material and a gas discharging port of a gas generator is blocked. In this case, a gas generated in the gas generator cannot be discharged as intended, so that the gas generator may explode. Particularly, when the gas discharging port of the gas generator is sealed by a closing member (such as a seal tape or a rupturing disk), and the closing member is ruptured by an increased inner pressure inside the housing (the inner pressure may be increased by generating a gas or heat) to release the gas, the inner pressure of the housing rises temporarily. Therefore, if the gas discharging port of the gas generator is clogged by a foreign material at the time when the closing member should be ruptured, the housing of the gas generator may break. Accordingly, focusing attention to this problem, the present invention provides a gas generator for an air belt apparatus in which such an adverse effect can be prevented and operational safety can be secured.

Incidentally, JP-A No. 2001-322522 discloses an art for reducing a pressure load applied to an air belt, and prevents a stress incurred to the air belt from becoming too high when a gas pressure from a gas generator becomes excessively high. However, this does not solve the problem derived during use for over the years. Practically, in the structure described in this document, the gas cannot be released if an introducing pipe (in particular, in the vicinity of a gas discharging port) is clogged with a foreign material, and thereby, an explosion of the gas generator cannot be avoided.

The inventor of the present application recognized such a danger, studied the cause thereof, and conceived the present invention.

In other words, the present invention can solve this problem by investigating the cause of the clogging of the gas flow passage (a conduit) during use for over the years and reaching such a conclusion that, in a conventional gas generator, a gas is discharged in an axial direction of the gas generator housing and the discharged gas passes through a substantially cylindrical discharging pipe (or the conduit) provided along the discharging direction of the gas, and thereby, the gas discharging port or the discharging pipe (or a conduit) is clogged by a foreign matter, and prevents the gas from releasing. Therefore, in the gas generator and the air belt apparatus according to the present invention, a direction of discharging the gas from the gas generator (to inflate an air belt) and a structure in the vicinity of the gas discharging port are improved.

Thus, the present invention is directed to a gas generator for an air belt apparatus for inflating an air belt by introducing a gas discharged from the gas generator, and comprises, a solid gas generating agent adapted to be burnt and generate at least one of a gas and a heat, and a housing accommodating the solid gas generating agent, wherein the housing is provided with a gas discharging port for discharging a gas generated inside the housing, and the gas discharging port discharges the generated gas in a radial direction of the housing.

Since the gas discharging port discharges the gas in the radial direction of the housing, the danger of the gas discharging port becoming clogged with a foreign material can be avoided as much as possible. Also, even if the foreign material enters in the axial direction of a gas generator and clogs a conduit (a discharging pipe or an introducing pipe) for the gas to flow, the gas is discharged radially from the gas discharging port, so that it is easy to secure another flow passage (an escape passage) other than the normal flow passage (that is, a flow passage passing through the conduit) by, for example, means described below. Further, by securing such another flow passage (the escape passage), an abnormal increase in a pressure inside the gas generator can be avoided.

Also, the safety at the time of assembly and distribution of the gas generator can be obtained by designing the gas to discharge in the radial direction of the gas generator. Namely, in the present invention, by arranging the gas discharging ports in the circumference of the gas generator to allow the gas to be discharged in the radial direction at equal intervals, or at least by arranging each gas discharging port at a position to counteract with a drifting power of the discharged gas, an erroneous activation of the gas generator and a displacement of the gas generator due to drifting power of the discharged gas can be avoided. In order to make this effect more remarkable, it is preferable to arrange the conduit at the final stage of the assembly of an air belt apparatus.

The escape passage for the gas discharged radially can be secured by connecting the conduit directly to the gas generator housing such that its end portion covers and faces the gas discharging port, and, in addition, by forming gas pressure releasing means in the conduit for releasing the gas inside the conduit when the inner pressure of the conduit at least in the vicinity of the gas discharging port is not less than a given pressure value.

The conduit which is directly connected to the gas generator housing is the conduit which receives the gas discharged from the gas generator, and includes a conduit connected to the housing via a sealing member, such as an O-ring, or via a connecting structure other than the conduit (e.g., a flange member), as well as the conduit in contact with the gas generator housing. Such a conduit corresponds to an introducing pipe when the gas discharged from a gas generator is introduced into the air belt directly through the introducing pipe. Such a conduit corresponds to a discharging pipe when the gas discharged from the gas generator is introduced into the introducing pipe through the discharging pipe connected to the gas generator. The gas pressure releasing means can also be provided with the discharging pipe.

The gas pressure releasing means is a structure or a member which deforms or opens by the pressure inside the pipe increased due to the gas discharged from the gas generator when the conduit (referred to as "an introducing pipe or a discharging pipe", hereinafter) is clogged with a foreign material, and operates when the inner pressure of the conduit in the vicinity of the gas discharging port is not less than a given pressure value, in other words, when the foreign material, clogged in the conduit, increases and exceeds the inner pressure of the conduit to a predetermined pressure (PX).

Usually, at the initial stage of the gas flowing from the gas generator into the conduit, the inside pressure of the conduit increases temporarily (the pressure at this time is referred to as PY). However, the pressure inside the conduit (PY) decreases as the gas flows towards the air belt. Therefore, the gas pressure releasing means in the present invention operates when PY<PX is met, although it may depend on an output performance of the gas generator. That is, the gas pressure releasing means in the present invention is formed to operate at the pressure (PX) exceeding the pressure (PY) increasing temporarily in the conduit. The reason is that, if the gas pressure releasing means operates at a pressure lower than the pressure (PY), the function of the air belt apparatus cannot be secured.

Such gas pressure releasing means can be formed, for example, as follows.

A conduit, connected directly to the gas generator housing, is formed substantially tubular, the end portion at the side covering the gas discharging port is formed as a flange portion having an inward flange shape, and the conduit is disposed such that a tip of this flange portion makes contact with the gas generator housing. The gas can escape through the gas releasing space by making a portion in the vicinity of the flange portion in the conduit deform when the inner pressure of the conduit being not less than a given pressure value (PX), and by forming the gas releasing space between the housing and the conduit. In this case, the flange portion can be formed to deform by itself. In the case of forming the flange portion this way, in order to secure the deformation due to the inner pressure of the conduit being not less than a given pressure value, a thickness, a material, a size of each portion, and a shape of this conduit are adjusted such that it operates at the pressure (PX) inside the conduit not less than the pressure (PY) which increases temporally, and further thereby, the flange portion does not deform by the discharging pressure (PZ) of the gas from the gas discharging ports but only by the inner pressure (PX) in the conduit being not less than a given pressure value.

It is also possible that the conduit, which is directly connected to the gas generator housing, is formed tubular and a fragile portion is formed on the circumferential surface of the conduit such that the fragile portion breaks due to the inner pressure of the conduit being not less than a given pressure value (PX). Such a fragile portion can be formed, for example, by providing a notch or a nick on the circumferential surface of the conduit near the gas discharging port, or by forming an opening portion in the vicinity of the gas discharging port in the conduit and covering this opening portion by a thin film made of metal and so on. When the fragile portion is formed in this way, a depth of the notch or a size of the nick, and an opening diameter or strength of the thin film have to be adjusted such that it opens due to the inner pressure of the conduit being not less than the given pressure value (PX).

In addition, the gas pressure releasing means may be formed by a configuration in which the inner pressure of the conduit, increased and exceeded the given pressure value (PX), is released by rupture of a portion in the vicinity of the gas discharging port in the conduit when the inner pressure of the conduit reaches and exceeds the given pressure value (PX).

Thus, the gas pressure releasing means, formed in the gas generator, operates at a higher inner pressure (PX) inside the conduit (PX) than an inner pressure (PY) inside the conduit increased temporarily upon activation of the gas generator, or a discharging pressure (PZ) of the gas from the gas discharging port.

In the above gas generator of the present invention, in a normal operation, that is, in an operation with no clogging inside the conduit, when the gas is released radially from the gas discharging port, the gas strikes an inner circumferential surface of the conduit, changes the flowing direction, and passes through the conduit. Therefore, between the gas discharging port and the inner circumference surface of the conduit, it is necessary to secure a space for a gas flow. Thus, in the gas generator of the present invention, in order to secure the space for the gas flow between the gas discharging port and the inner circumference surface of the conduit, desirably, a portion of the gas generator, in which the gas discharging port is formed, is formed to have a smaller outer diameter than a main body of the gas generator housing (a portion accommodating a gas generating agent). In view of this, it is desirable that the housing has a tubular shape and the gas discharging port is arranged at one end portion thereof.

In the gas generator related to the present invention, it is necessary to accommodate a gas generating agent, which generates at least a gas or heat by combustion, inside the housing. By accommodating such a gas generating agent, upon operation of the gas generator, an inner pressure of the housing increases and becomes not less than a given pressure value. Furthermore, in the housing, a pressurized gas for inflating the air belt can be accommodated in addition to the gas generating agent. Further, the gas generator may include only the pressurized gas.

Also, in this gas generator, a conventionally known activating device for burning the gas generating agent (e.g., an igniter and so on), or a structure for preventing the outside air from entering the housing before activation of the gas generator (for example, a member for closing a gas discharging port) can be adopted.

The above gas generator is used in conjunction with an air belt inflated by the introduced gas, thereby forming the air belt apparatus of the present invention. In manufacturing this air belt apparatus, the conduit directly connected to the gas generator housing can be used either as a component of an air belt apparatus or as a component of the gas generator. In addition, the above conduit may be a component of the air belt.

As to the necessary components and structures, which are used in the manufacturing of the air belt apparatus, conventional arts may be employed except for the gas generator and the conduit directly connected to the gas generator.

Since the gas generator for an air belt apparatus of the present invention, composed as described above, discharges the gas in the radial direction of a housing, even when the conduit is clogged with a foreign material and a flow passage does not work properly, another flow passage can be secured.

Particularly, in the gas generator provided with the conduit, when the inner pressure of the conduit increases abnormally, an escape passage for the gas is formed, for example, by deforming or cutting part of the conduit.

As the result, even when the gas flow passage (the conduit) is clogged with a foreign material and the gas discharging port of the gas generator is clogged during use for over the years, abnormal pressure increase in the gas generator is prevented and an inconvenience such as an explosion of the gas generator housing can be avoided. Accordingly, the gas generator for an air belt apparatus and the air belt apparatus that secures operation safety over the years is provided.

Also, the gas generator of the present invention discharges the gas in the radial direction thereof, so that, even if the gas generator operates erroneously during assembly and distribution of the gas generator, drifting power of the discharged gas is counteracted. Therefore, the gas generator is prevented from launching, and safety during the distribution and assembly can also be obtained.

DETAILED DESCRIPTION OF THE PRESENT INVENTION

An embodiment of the present invention will be described below with reference to the drawings.

Figure 1:
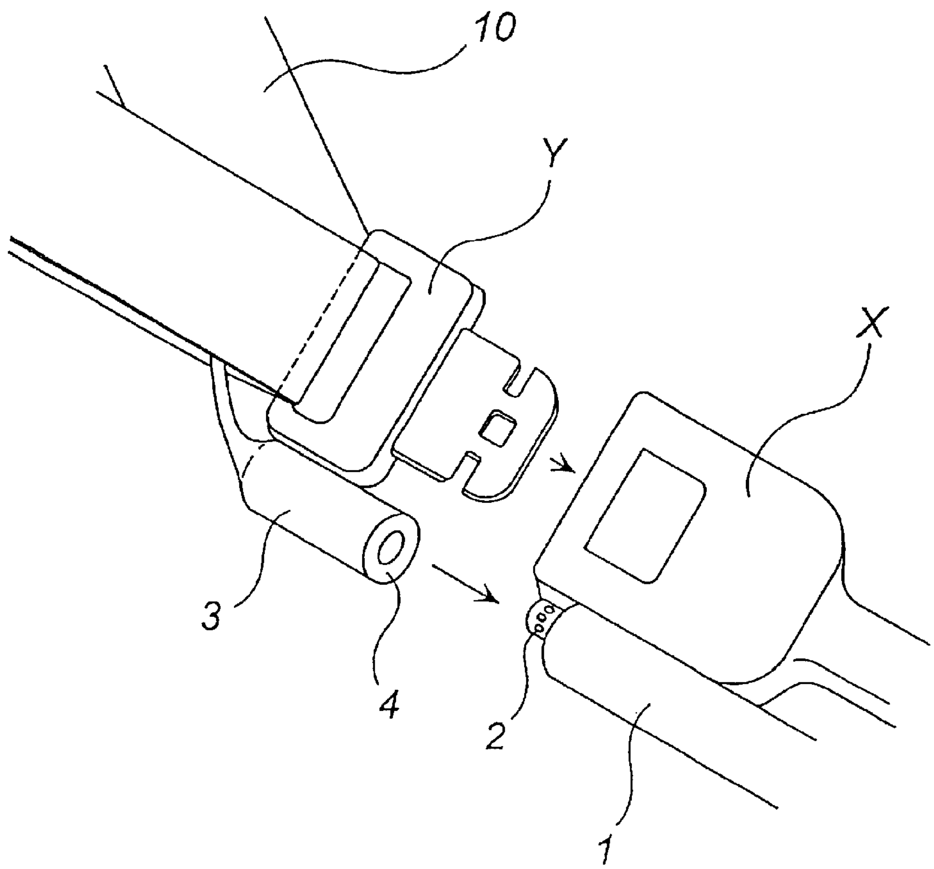
FIG. 1 is an obliquely observed view showing an essential part of an air belt apparatus of the first embodiment.
Figure 2:
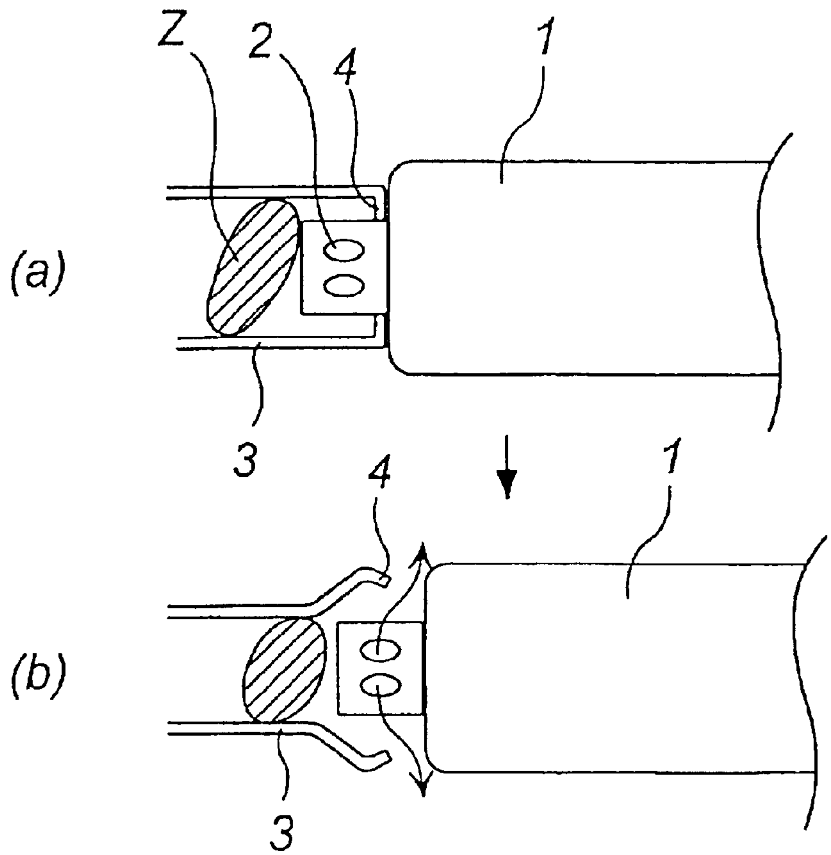
FIGS. 2(*a*) and 2(*b*) are principal cross sections showing an operation of the air belt apparatus of FIG. 1.
Figure 3:
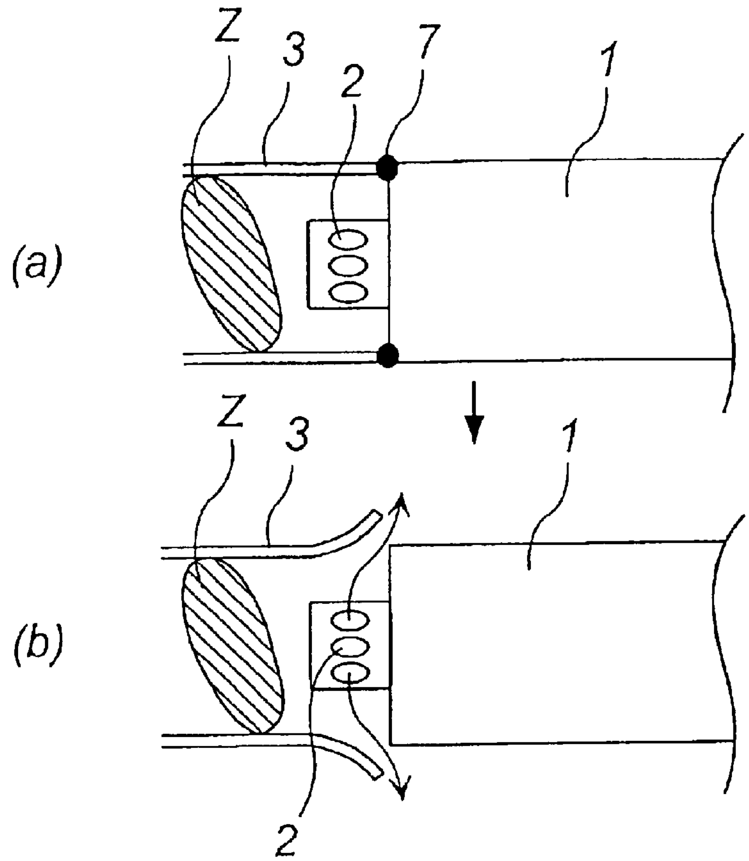
FIGS. 3(*a*) and 3(*b*) are principal cross sections showing an operation state in gas pressure releasing means.
Figure 4:
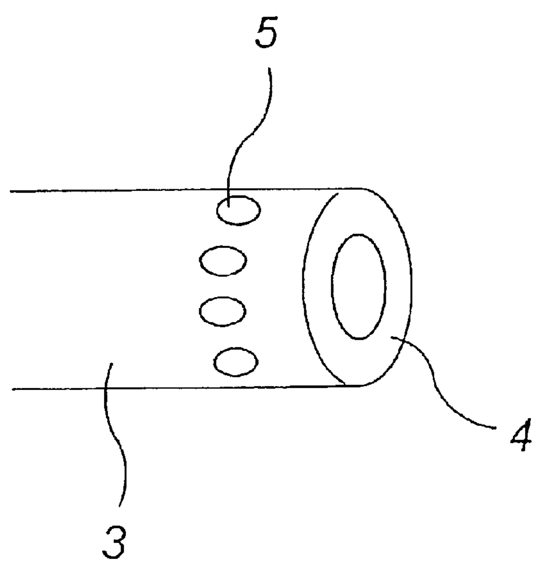
FIG. 4 is an obliquely observed view showing an essential part of another example of the gas pressure releasing means.
Figure 5:
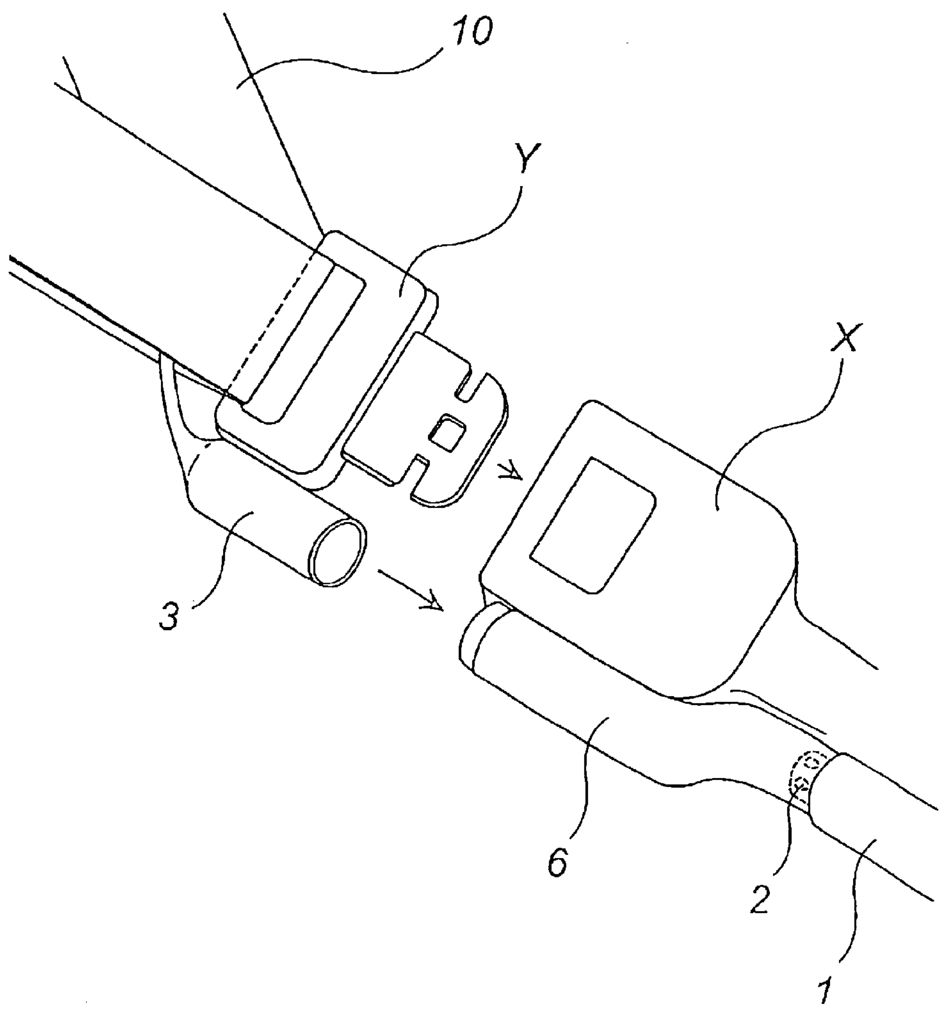
FIG. 5 is an obliquely observed view showing an essential part of an air belt apparatus related to another embodiment.

FIG. 1 is an obliquely observed view that shows an essential part of an air belt apparatus of the first embodiment. FIGS. 2(*a*) and 2(*b*) are principal cross sections showing an operation in the air belt apparatus of FIG. 1. FIGS. 3(*a*) and 3(*b*) are principal cross sections showing an operation state in gas pressure releasing means. FIG. 4 is an obliquely observed view showing an essential part of another example of the gas pressure releasing means. FIG. 5 is an obliquely observed view showing an essential part of an air belt apparatus related to another embodiment.

In an air belt apparatus shown in FIG. 1, an air belt 10, having a belt portion into which a gas is introduced to inflate the air belt 10 in order to restrain a vehicle occupant, is arranged, and a tongue Y is connected to the belt portion (or an air belt 10). In this tongue Y, as a conduit to introduce the gas from a gas generator 1 and to direct the gas to the air belt 10, an introducing pipe 3 is provided.

Meanwhile, in a buckle X extending from a floor or a seat of a vehicle, the gas generator 1, which receives an operation signal and generates the gas to inflate the air belt 10, is provided. This gas generator 1 is provided with gas discharging ports 2 for discharging the gas generated by combustion of a gas generating agent (not shown) or by inflation due to heat generated as a result of the combustion, and the gas discharging ports 2 are arranged at equal intervals on a circumferential surface of an end portion of a housing of the gas generator 1.

A flange portion 4 having an inward flange-like shape is formed at an end portion of the introducing pipe 3 in the gas generator side, and, when the tongue Y is inserted into the buckle X, the inner circumferential surface of the flange portion 4 makes contact with an outer circumferential surface of the housing (an shell container) of the gas generator 1. At this time, the gas discharging port 2 is accommodated in the introducing pipe 3.

In the air belt apparatus formed as described above, during use thereof over the years, even when a foreign material Z enters the introducing pipe 3 and a gas flow passage is clogged as shown in FIG. 2(*a*), the gas is discharged from the gas generator 1 in the radial direction, so that an escape passage to another direction (in the drawing, to the diagonally backward direction) can be secured as shown in FIG. 2(*b*). As the result, since an abnormal pressure increase in the gas generator housing is prevented, the housing is prevented from exploding.

As the structure of the air belt 10 of an air belt apparatus shown in FIG. 1, a conventionally known art such as the one described in JP-A No. 2001-322522 can be employed, and also as to the inner structure of the gas generator 1, for example, a gas generating agent or a structure of ignition means, which activates upon receiving an operation signal and burns the gas generating agent (such as an igniter), conventionally known art can also be used. Therefore, in the present embodiment, a detailed description thereof is omitted. Furthermore, also as to an apparatus for sending the operation signal to the ignition means (such as an igniter) included in the gas generator 1, conventionally known art can be used. Therefore, a detailed description thereof is omitted.

As shown in FIG. 2(*b*), gas pressure releasing means is formed at a portion in the vicinity of a flange portion 4 which deforms upon receiving a pressure not less than a given pressure value and forms a space for releasing the gas. In this embodiment, the introducing pipe 3 (a conduit) is formed of a cylinder made of stainless steel in order to obtain deformation at the portion in the vicinity of the flange portion 4 with such a gas pressure. As the result, the introducing pipe 3 does not deform by the gas pressure discharged from the gas discharging port 2, but deforms only by the pressure in the introducing pipe 3 at the time when the introducing pipe 3 is clogged.

Also, when the gas releasing means is formed, the introducing pipe 3 at the gas generator side is made tubular and the end portion thereof is provided with sealing means 7, such as an o-ring, as shown in FIG. 3(*a*), without forming a flange portion 4 as shown in FIG. 1. In this case, the sealing means 7 closely joins the housing of the gas generator 1 to the introducing pipe 3 and seals between the introducing pipe 3 and the gas generator 1. When the introducing pipe 3 is formed in this way, a certain volume of space for realizing gas circulation also needs to be secured between the gas discharging port 2 and the introducing pipe 3. As shown in FIG. 3(*a*), when the introducing pipe 3 is clogged by a foreign material Z and the inner pressure of the introducing pipe 3 increases and exceeds a given pressure value, a portion in the vicinity of a surface, which faces the gas discharging port 2, in the introducing pipe 3 is bent as shown in FIG. 3(*b*) and a flow passage for releasing the gas is formed.

In addition, the gas pressure releasing means can be formed to face the gas discharging port 2 in the introducing pipe 3 as a fragile portion. For example, as shown in FIG. 4, a nick 5 which deforms and opens only by a pressure inside the introducing pipe 3 generated when the introducing pipe 3 is clogged, may be formed as a fragile portion in a portion in the vicinity of a surface which faces a gas discharging port 2. In this case, the nick portion 5 opens by the abnormal pressure increase in the introducing pipe 3 and the pressure in the introducing pipe 3 is released.

Further, the gas pressure releasing means maybe formed by forming a port at a portion in the vicinity of a surface, which faces the gas discharging port, in the introducing pipe 3 and closing the port with a metallic foil, such as a seal tape, that ruptures by a pressure not less than a given pressure value in the introducing pipe 3. The pressure at which the metallic foil ruptures can be adjusted by optimizing a diameter or an opening area of the gas discharge port, the number of ports, material or thickness of the metallic foil, and so on.

When the gas pressure releasing means is formed by using the fragile portion or the metallic foil, desirably, it is formed not to receive the gas from the gas discharging port directly.

In the air belt apparatuses shown in FIGS. 1 to 4, when the introducing pipe 3 is not clogged (normal state), the gas discharged radially from the gas discharging port 2 passes through a space between the gas discharging port 2 and an inner circumferential surface of the introducing pipe 3, and passes inside an introducing pipe 3 in the longitudinal direction thereof.

Although, in the air belt apparatuses shown in FIGS. 1 to 4, the introducing pipe 3 constituting part of the air belt 10 is directly connected to the gas generator 1, a discharging pipe 6, a conduit directly connected to the housing of the gas generator 1 and connecting the gas generator 1 and the introducing pipe 3, as shown in FIG. 5, may be used. In this case, the embodiment of the above gas pressure releasing means, that is, the portion in the vicinity of a flange portion 4, which deforms due to the gas pressure being not less than the given pressure value, is arranged in the discharging pipe 6 (the conduit which is directly connected to a housing of a gas generator 1).

Thus, the air belt apparatus of the embodiment shown in FIG. 5 is the same as that shown in the above FIG. 1 in the arrangement of the introducing pipe 3 and the tongue Y provided in the belt portion of a seat belt (or the air belt 10), and in the arrangement of the gas generator 1 and the buckle X extending from a floor or a seat of a vehicle. However, the embodiment shown in FIG. 5 is different from the air belt apparatus shown in above FIG. 1 in that the gas generator 1 and the introducing pipe 3 are connected via the discharging pipe 6, and that the introducing pipe 3 is not directly connected to the gas generator 1.

In the air belt apparatus shown in this embodiment, since one end of the discharging pipe 6 is directly connected to the gas generator 1, the gas pressure releasing means is arranged in a portion connected to the gas generator 1 inside the discharging pipe 6. Naturally, the gas pressure releasing means may be formed in the introducing pipe 3 connected to the opposite side end portion of the discharging pipe 6.

In the air belt apparatus formed as described above, even when a foreign material Z enters the introducing pipe 3 or the discharging pipe 6, and the pressure near the gas discharging port 2 increases abnormally, the gas pressure releasing means arranged in the discharging pipe 6 operates to release the gas. Therefore, the gas generator 1 shown in this embodiment can also prevent an abnormal pressure increase in the housing and the housing of the gas generator 1 can be prevented from exploding.

What is claimed is:

1. An air belt apparatus for inflating an air belt, comprising:

a gas generator for generating a gas upon collision of a vehicle, the gas generator including a housing and a gas discharging port for discharging a gas from the housing; and a conduit having a first end adapted to be connected to the housing and a second end connected to the air belt for directing the gas discharged from the housing to the air belt, the conduit being provided with gas pressure releasing means at a vicinity of the first end for releasing the discharged gas to an outside of the conduit without providing the gas to the air belt when a pressure inside the conduit increases above a given pressure due to a foreign material clogging the conduit.

2. The gas generator as claimed in claim 1, wherein the conduit is cylindrical in shape, and the gas pressure releasing means is a fragile portion formed on a circumferential surface of the conduit, such that the fragile portion breaks to form an opening for releasing the gas to the outside of the conduit without providing the gas to the air belt when the pressure inside the conduit increases above the given pressure.

3. An air belt apparatus as claimed in claim 2, wherein the fragile portion is a nick formed in the conduit.

4. The gas generator as claimed in claim 1, wherein the housing accommodates a pressurized gas for inflating the air belt.

5. An air belt apparatus as claimed in claim 1, wherein, when the first end of the conduit is connected to the housing, an inner surface of the first end opposes the gas discharging port while forming a space therebetween.

6. The gas generator as claimed in claim 1, wherein the housing accommodates a solid gas generating agent.

7. The gas generator for inflating an air belt, comprising:

a gas generator for generating a gas upon collision of a vehicle, the gas generator including a housing and a gas discharging port for discharging a gas from the housing in a radial direction of the housing in a radial direction of the housing; and a conduit having a first end adapted to be connected to the housing and a second end connected to the air belt for directing the gas discharged from the housing to the air belt, the conduit being provided with gas pressure releasing means at a vicinity of the first end for releasing the discharged gas to an outside of the conduit when a pressure inside the conduit increases above a given pressure due to a foreign material clogging the conduit, wherein the conduit is substantially cylindrical in shape, and the gas pressure releasing means is an inward flange portion formed at the first end of the conduit that surrounds the gas discharging port when the conduit is connected to the housing, and the flange portion deforms when the pressure inside the conduit increases above the given pressure to form an opening for releasing the gas to the outside of the conduit.

8. The gas generator as claimed in claim 7, wherein the flange portion deforms outwardly.

9. The air belt apparatus for inflating an air belt, comprising:

a gas generator for generating a gas upon collision of a vehicle, the gas generator including a housing and a gas discharging port for discharging a gas from the housing in a radial direction of the housing;

a first conduit having a first end connected to the housing and a second end adapted to be connected to a second conduit for directing the gas discharged from the housing to an air belt via the first conduit and the second conduit, the first end being provided with gas pressure releasing means for releasing the discharged gas to an outside of the first conduit when a pressure inside the first conduit increases above a given pressure by a foreign material clogging at least one of the first conduit and the second conduit, wherein the first conduit is substantially cylindrical in shape, and the gas pressure releasing means is an inward flange portion formed at the first end of the first conduit that surrounds the gas discharging port, an end of the flange portion makes contact with the housing, and the flange portion deforms when the pressure inside the first conduit increases above the given pressure to form a space for releasing the gas.

10. The air belt apparatus as claimed in claim 9, wherein the flange portion deforms outwardly.

11. An air belt apparatus for inflating an air belt, comprising:

a gas generator for generating a gas upon collision of a vehicle, the gas generator including a housing and a gas discharging port for discharging a gas from the housing in a radial direction of the housing;

a first conduit having a first end connected to the housing and a second end adapted to be connected to a second conduit for directing the gas discharged from the housing to an air belt via the first conduit and the second conduit, the first end being provided with gas pressure releasing means for releasing the discharged gas to an environment outside of the first conduit and the second conduit when a pressure inside the first conduit increases above a given pressure by a foreign material clogging at least one of the first conduit and the second conduit.

12. The air belt apparatus as claimed in claim 11, wherein the first conduit is cylindrical in shape, and the gas pressure releasing means is a fragile portion formed on a circumferential surface of the first conduit, such that the fragile portion breaks to form an opening for releasing the gas to the environment outside of the first conduit and the second conduit when the pressure inside the first conduit increases above the given pressure.

13. An air belt apparatus as claimed in claim 12, wherein the fragile portion is a nick formed in the first conduit.

14. An air belt apparatus as claimed in claim 11, wherein, an inner surface of the first end opposes the gas discharging port while forming a space therebetween.

15. The gas generator as claimed in claim 11 wherein the housing accommodates a solid gas generating agent.

16. The gas generator as claimed in claim 11, wherein the housing accommodates a pressurized gas for inflating the air belt.

* * * * *